United States Patent
Penland, Jr.

(10) Patent No.: US 9,617,693 B1
(45) Date of Patent: *Apr. 11, 2017

(54) LIFTING ELEMENTS FOR CRANE MATS

(71) Applicant: QUALITY MAT COMPANY, Beaumont, TX (US)

(72) Inventor: Joe Penland, Jr., Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,545

(22) Filed: Dec. 13, 2016

Related U.S. Application Data

(60) Continuation-in-part of application No. 15/244,614, filed on Aug. 23, 2016, which is a continuation-in-part of application No. 15/188,113, filed on Jun. 21, 2016, which is a continuation-in-part of application No. 15/155,685, filed on May 16, 2016, which is a continuation-in-part of application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a
(Continued)

(51) Int. Cl.
*E01C 9/08* (2006.01)
*E01C 5/22* (2006.01)

(52) U.S. Cl.
CPC .............. *E01C 9/086* (2013.01); *E01C 5/22* (2013.01)

(58) Field of Classification Search
CPC . E01C 9/086; E01C 9/08; E01C 11/24; E01C 5/00
See application file for complete search history.

(56) References Cited

U.S. PATENT DOCUMENTS 2,836,529 A    5/1958  Morris
3,078,621 A    2/1963  Hinds
(Continued)

FOREIGN PATENT DOCUMENTS

CA    2 233 776 A1    12/1999
CA    2 637 470 A1    1/2010
(Continued)

OTHER PUBLICATIONS

U.S. Appl. No. 15/240,171, Non-Final Rejection, Dec. 20, 2016.
(Continued)

*Primary Examiner* — Abigail A Risic
(74) *Attorney, Agent, or Firm* — Winston & Strawn LLP

(57) ABSTRACT

An industrial mat having a supporting structure; an upper layer provided above the supporting structure for forming an upper surface of the mat, a lower layer provided below the supporting structure for providing a lower surface of the mat; and lifting elements attached to the upper layer, the lower layer or the supporting structure. The lifting elements include D-shaped members, O-shaped members, U-shaped members, eyelets, hooks, circular or polygonal rings, chains, or cables that are configured and dimensioned for attachment to attached to the supporting structure or the upper or lower layer with sufficient strength to provide certified overhead lifting of the mat for installation and reclamation thereof.

20 Claims, 7 Drawing Sheets

Related U.S. Application Data continuation-in-part of application No. 14/839,888, filed on Aug. 28, 2015, now Pat. No. 9,315,949, application No. 15/377,545, which is a continuation-in-part of application No. 15/331,130, filed on Oct. 21, 2016, which is a division of application No. 15/155,685, which is a continuation-in-part of application No. 15/081,340, which is a continuation-in-part of application No. 15/056,212, which is a continuation-in-part of application No. 14/839,888.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/211,664, filed on Aug. 28, 2015.

(56) References Cited

U.S. PATENT DOCUMENTS

| | | | |
|---|---|---|---|
| 3,985,169 A | 10/1976 | Chow | |
| 4,324,037 A | 4/1982 | Grady, II | |
| 4,462,712 A | 7/1984 | Penland, Sr. | |
| 4,600,336 A | 7/1986 | Waller, Jr. | |
| 4,629,358 A | 12/1986 | Springston et al. | |
| 4,875,800 A | 10/1989 | Hicks | |
| 4,889,444 A | 12/1989 | Pouyer | |
| 4,932,178 A | 6/1990 | Mozingo | |
| 5,020,937 A | 6/1991 | Pouyer | |
| 5,032,037 A | 7/1991 | Phillips et al. | |
| 5,050,366 A | 9/1991 | Gardner et al. | |
| 5,113,632 A | 5/1992 | Hanson | |
| 5,139,845 A | 8/1992 | Beckerman et al. | |
| 5,163,776 A | 11/1992 | Pouyer | |
| 5,241,163 A | 8/1993 | Vachtsevanos et al. | |
| 5,273,373 A | 12/1993 | Pouyer | |
| 5,342,260 A | 8/1994 | Markland | |
| 5,402,609 A | 4/1995 | Kelley, Jr. | |
| 5,535,694 A | 7/1996 | Czipri | |
| 5,653,551 A | 8/1997 | Seaux | |
| 5,679,191 A | 10/1997 | Robinson | |
| 5,822,944 A | 10/1998 | Penland, Sr. | |
| 5,888,612 A | 3/1999 | Needham et al. | |
| 5,930,967 A | 8/1999 | Stoehr et al. | |
| 5,985,415 A | 11/1999 | Giltner | |
| 6,007,271 A | 12/1999 | Cole et al. | |
| 6,023,900 A | 2/2000 | Stoehr et al. | |
| 6,214,428 B1 | 4/2001 | Henderson | |
| 6,231,950 B1 | 5/2001 | Giltner | |
| 6,231,994 B1 | 5/2001 | Totten | |
| 6,365,650 B1 | 4/2002 | Chen et al. | |
| 6,380,309 B1 | 4/2002 | Parker et al. | |
| 6,450,235 B1 | 9/2002 | Lee | |
| 6,474,905 B1 | 11/2002 | Smith, Jr. et al. | |
| 6,497,956 B1 | 12/2002 | Phillips et al. | |
| 6,511,257 B1 | 1/2003 | Seaux et al. | |
| 6,649,110 B1 | 11/2003 | Seaux et al. | |
| 6,662,508 B1 | 12/2003 | Else | |
| 6,695,527 B2 | 2/2004 | Seaux et al. | |
| 6,722,831 B2 | 4/2004 | Rogers | |
| 6,763,873 B2 | 7/2004 | Lee | |
| 6,821,623 B2 | 11/2004 | Kvesic | |
| 6,945,732 B2 | 9/2005 | Renick | |
| 7,137,226 B2 | 11/2006 | Fiutak et al. | |
| 7,303,800 B2 | 12/2007 | Rogers | |
| 7,404,690 B2 * | 7/2008 | Lukasik | E01C 5/18 404/29 |
| 7,413,374 B2 | 8/2008 | Rogers et al. | |
| 7,427,172 B2 | 9/2008 | Lukasik | |
| D609,956 S | 2/2010 | Lukasik | |
| 7,818,929 B2 | 10/2010 | Fiutak et al. | |
| 7,934,885 B2 | 5/2011 | Fournier | |
| 8,061,929 B2 | 11/2011 | Dagesse | |
| 8,070,004 B2 | 12/2011 | Williams et al. | |
| 8,088,477 B2 | 1/2012 | Curtis et al. | |
| 8,382,393 B1 | 2/2013 | Phillips | |
| 8,424,577 B2 | 4/2013 | Poutanen | |
| 8,613,373 B2 | 12/2013 | Holtby et al. | |
| 8,734,263 B2 | 5/2014 | Ford et al. | |
| 8,784,001 B1 | 7/2014 | Phillips et al. | |
| 8,857,125 B2 | 10/2014 | Lu et al. | |
| 8,906,480 B2 | 12/2014 | Fiutak et al. | |
| 8,936,073 B1 | 1/2015 | Phillips | |
| 9,133,598 B2 | 9/2015 | Hsu | |
| 9,347,184 B2 | 5/2016 | Evelyn | |
| 2002/0110418 A1 | 8/2002 | Renick | |
| 2004/0037644 A1 | 2/2004 | Renick | |
| 2004/0071914 A1 | 4/2004 | Fiutak et al. | |
| 2004/0253055 A1 | 12/2004 | Polivka, Jr. | |
| 2005/0022363 A1 | 2/2005 | Harrison | |
| 2006/0034654 A1 | 2/2006 | Sanders | |
| 2006/0179733 A1 | 8/2006 | Padmanabhan | |
| 2006/0265976 A1 | 11/2006 | Fiutak et al. | |
| 2007/0056228 A1 | 3/2007 | Penland, Sr. et al. | |
| 2007/0237581 A1 | 10/2007 | Lukasik et al. | |
| 2008/0028703 A1 | 2/2008 | Brandstrom | |
| 2008/0085154 A1 | 4/2008 | Lukasik | |
| 2008/0152861 A1 | 6/2008 | Barker | |
| 2008/0292397 A1 | 11/2008 | Farney et al. | |
| 2009/0087261 A1 | 4/2009 | Fournier | |
| 2009/0301004 A1 | 12/2009 | Dagesse | |
| 2011/0233363 A1 | 9/2011 | Wold | |
| 2011/0280657 A1 | 11/2011 | Martinez | |
| 2012/0063844 A1 | 3/2012 | Wold | |
| 2013/0284872 A1 | 10/2013 | Tubbs | |
| 2013/0306804 A1 | 11/2013 | Holtby et al. | |
| 2013/0318896 A1 | 12/2013 | Rogers | |
| 2014/0154462 A1 | 6/2014 | Fiutak et al. | |
| 2014/0183319 A1 | 7/2014 | Tubbs | |
| 2014/0186573 A1 | 7/2014 | Tubbs | |
| 2014/0193196 A1 | 7/2014 | Fournier | |
| 2014/0199119 A1 | 7/2014 | Stasiewich | |
| 2014/0205377 A1 | 7/2014 | Hill | |
| 2014/0341649 A1 | 11/2014 | Bryan et al. | |

FOREIGN PATENT DOCUMENTS

| | | |
|---|---|---|
| EP | 1 600 558 A1 | 11/2005 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

Richard West Co., Inc, Steel Reinforced Crane Mat, downloaded from the Internet on May 11, 2016 (see http://www.richardwestcompany.com/products.html).

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties (1999).

"Inflammable". Wiktionary. Archived Sep. 6, 2014.

International Search Report and Written Opinion, Appl. No. PCT/US2016/020081, Jun. 2, 2016.

International Search Report and Written Opinion, Appl. No. PCT/US2016/020067, Aug. 8, 2016.

"Crane Mat", retrieved from http://www.qmat.com/products/crane-mats/ (2015).

Quality Mat Company website: http://www.qmat.com/ (2015).

U.S. Appl. No. 15/244,614, Non-Final Rejection, Dec. 15, 2016.

* cited by examiner

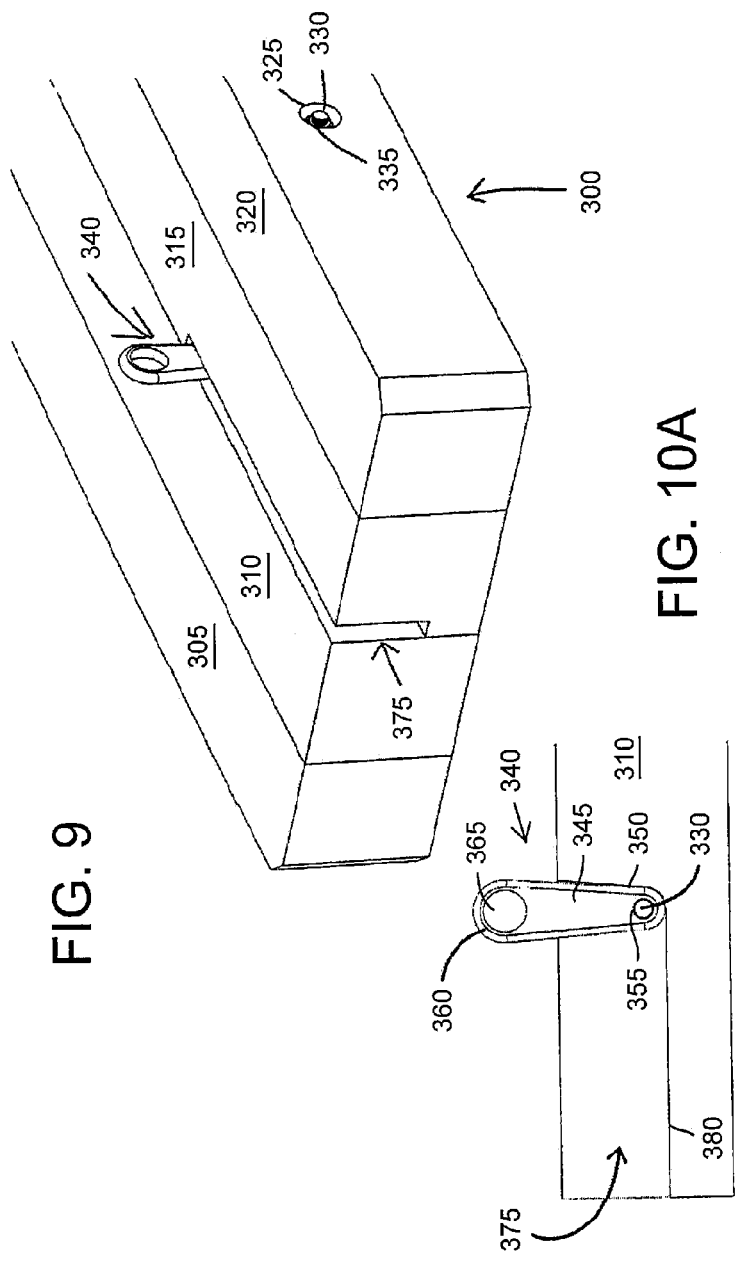
FIG. 9
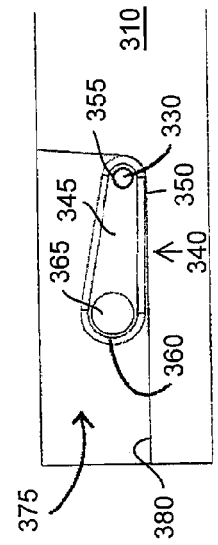
FIG. 10A
FIG. 10B

LIFTING ELEMENTS FOR CRANE MATS

CROSS-REFERENCE TO RELATED APPLICATIONS

This application is a continuation-in-part of application Ser. No. 15/244,614 filed Aug. 23, 2016, which is a continuation-in-part of application Ser. No. 15/188,113 filed Jun. 21, 2016, which is a continuation-in-part of application Ser. No. 15/155,685 filed May 16, 2016, which is a continuation-in-part of application Ser. No. 15/081,340 filed Mar. 25, 2016, now U.S. Pat. No. 9,476,164, which is a continuation-in-part of application Ser. No. 15/056,212 filed Feb. 29, 2016, now U.S. Pat. No. 9,447,547, which is a continuation-in-part of application Ser. No. 14/839,888 filed Aug. 28, 2015, now U.S. Pat. No. 9,315,949, which claims the benefit of each of application Ser. Nos. 62/054,186 filed Sep. 23, 2014, 62/138,143 filed Mar. 25, 2015, and 62/158,196 filed May 7, 2015.

Application Ser. No. 15/244,614 filed Aug. 23, 2016 claims the benefit of application Ser. No. 62/211,664 filed Aug. 28, 2015.

This application is also a continuation-in-part of application Ser. No. 15/331,130 filed Oct. 21, 2016, which is a division of application Ser. No. 15/155,685 filed May 16, 2016, which is a continuation-in-part of application Ser. No. 15/081,340 filed Mar. 25, 2016, now U.S. Pat. No. 9,476,164, which is a continuation-in part of application Ser. No. 15/056,212 filed Feb. 29, 2016, now U.S. Pat. No. 9,447,547, which is a continuation-in-part of application Ser. No. 14/839,888 filed Aug. 28, 2015, now U.S. Pat. No. 9,315,949, which claims the benefit of application Ser. No. 62/054,186 filed Sep. 23, 2014.

Each of the foregoing applications is expressly incorporated herein by reference thereto.

BACKGROUND

The present invention relates to lifting elements for large crane mats. These mats are typically used in construction sites that require heavy lifting, crane support stabilization, temporary areas for installation of pipelines or bridges, and other support structures in locations where the ground requires grading and stabilization to provide a flat support surface for such equipment or activities.

Conventional industrial mats are typically 4 feet wide and utilize beams having square or rectangular cross sections of sizes between 8×8 inch to 16×16 inch that are up to 40 feet in length that are connected by joining members or carriage bolts. Typically, the beams are made of oak and preferably white oak as that material provides acceptable performance of the mats for a significant service life at a reasonable cost. Such mats are available from Quality Mat Company, Beaumont, Tex. These mats, which are often called timber mats or crane mats. There are concerns regarding the lifting and movement of such mats due to their relatively large sizes.

In the past, lifting, manipulation and placement of the mats were facilitated by exposing part of the joining member for grasping by a lifting hook of a crane or other heavy piece of equipment. While the exposure of the joining or connecting rod facilitated lifting or moving operations, it presented an issue in that workers could inadvertently step into over the open hole that was provided around the connecting rod. Also, the larger sizes of these mats require lifting elements that facilitate overhead lifting elements. Thus, other designs are needed to more easily move these large mats as well as to provide greater safety to personnel working on these mats.

SUMMARY OF THE INVENTION

The present invention now satisfies this need in the art for lifting large crane mats by providing newly designed and improved lifting elements and associated structures and arrangements for lifting and manipulation of the mats. These elements, structures and arrangements also provide a lower profile where the lifting elements are maintained below the working surface of the mat to promote safety for workers.

In particular, the invention now provides a crane mat having overhead lifting capability, the crane mat comprising a plurality of a plurality of longitudinal beams that are positioned in a side by side arrangement; each of the beams having a plurality of spaced lateral apertures passing therethrough, with the lateral apertures being in alignment to form bores through the mat; a plurality of joining members with each member passing through each beam through the aligned lateral apertures to hold the beams together in the side by side arrangement; and one or more lifting elements located in an opening that is at least partially present in one of the beams at or below the working surface of the mat to facilitate moving or manipulation of the mat. The lifting element comprises a loop portion that is configured with an opening sufficient to receive and allow grasping by a hook, fingers, hand or other lifting member, and a securement portion that includes an opening sufficient to receive a joining member therein, with the loop and securement portions either connected to each other or forming a unitary lifting element, and with a joining member passing through the securement portion to attach the lifting element to the mat.

The mat or a beam member has an opening or recess configured and dimensioned to receive the lifting element therein in a storage position with the lifting element maintained at or below the working surface of the mat when not used for lifting or moving of the mat or when securing articles thereto. By maintaining the lifting element in the mat so that it does not protrude above the working surface, tripping over the element by workers operating on the mat is minimized, and the possibility of stepping into a hole in the mat is eliminated, since in most cases, the lifting element fills in the opening when in the storage position. Also, the loop portion is movable to a lifting position that exposes the loop above the working surface of the mat for engagement by a hook or other grasping element for lifting, manipulation or movement of the mat or for securing other articles to the lifting element.

The joining member preferably comprises a rod or carriage bolt; and the longitudinal beams have a rectangular cross section with width by height dimensions of between about 6 by 6 inches to about 24 by 24 inches and a length of between about 4 and about 60 feet; and are made of wood, metal, plastic or elastomeric materials that are solid; hollow and unfilled or filled with other materials; or are composed of layers which are preferably oriented so that the lateral apertures and joining members pass through each layer. Also, the loop portion preferably comprises a D-shaped member, an O-shaped member, a U-shaped member, an eyelets, a hook, a portion of a circular or polygonal ring, chain link, or cable that has sufficient strength to provide certified overhead lifting of the mat for installation and reclamation thereof.

In a preferred embodiment, the loop and securement portions are joined together by a body to form an elongated unitary component that has the loop portion configured as an opening on one end of the component and the securement portion is present as an opening on the opposite end of the component. The securement portion of the elongated unitary component may be arcuate or rounded to facilitate a pivoting motion about the joining member when the recess in the mat is a vertically arranged slot that is configured to receive the component with the loop portion below the mat working surface in the storage position. Thus, the loop portion can pivot to the lifting position to expose the loop portion above the mat working surface. The slot preferably has a rectangular shape and a flat or sloped bottom wall upon which the elongated unitary member rests when in the storage position.

In another embodiment, the securement portion comprises a support plate; an attachment member for attaching the loop member to the support plate; and a base plate that includes the opening for receiving the joining member. The loop portion may be a D- or O-shaped ring and the attachment portion is a U-shaped member attached to the support plate and having a sufficient opening to allow the loop portion to pivot between the storage and lifting positions. The support plate is preferably oriented and positioned to be parallel to but beneath the working surface of the mat, with the attachment member located on an upper surface of the support plate, and the base plate is attached to a lower surface of the support plate and is oriented perpendicularly thereto. The lifting element is made of steel or another metal, preferably one that is weldable, so that the attachment member and base plate can be welded to the support plate. The recess is preferably a horizontally configured recess provided beneath the working surface of the mat upon adjacent longitudinal beams with the base plate extending in the space between the beams, wherein the recess has a depth that is greater than the combined thickness of the support plate, attachment member and loop member so that the lifting element resides beneath the working surface of the mat when in the storage position.

In yet another embodiment, the recess provides a sufficient opening in the mat to expose a portion of the joining member and the lifting element comprise a ring, cable, or chain that receives the exposed joining member. Advantageously, the recess opening also provides sufficient space to receive and maintain the lifting element in the storage position beneath the working surface of the mat. If desired, the opening of the recess can be reinforced with metal plates or a collar which protects the opening from contact by the ring, chain or cable and which adds stability as the mat is being lifted or moved.

Between 2 and 12 lifting elements are provided in the mat, preferably in a symmetrical pattern. The openings or recesses for at least two of the lifting elements are spaced about 1 to 3 feet from the front or rear ends of the mat so as to provide easy access by the crane or lifting device.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 9 is a perspective view of a second embodiment of a crane mat having new lifting elements according to the present invention;

FIG. 10 is presented as FIGS. 10A and 10B which are a partial sectional views of the lifting element of the mat of FIG. 9 in operative and storage positions respectively.

DETAILED DESCRIPTION OF THE INVENTION

Figure 1:
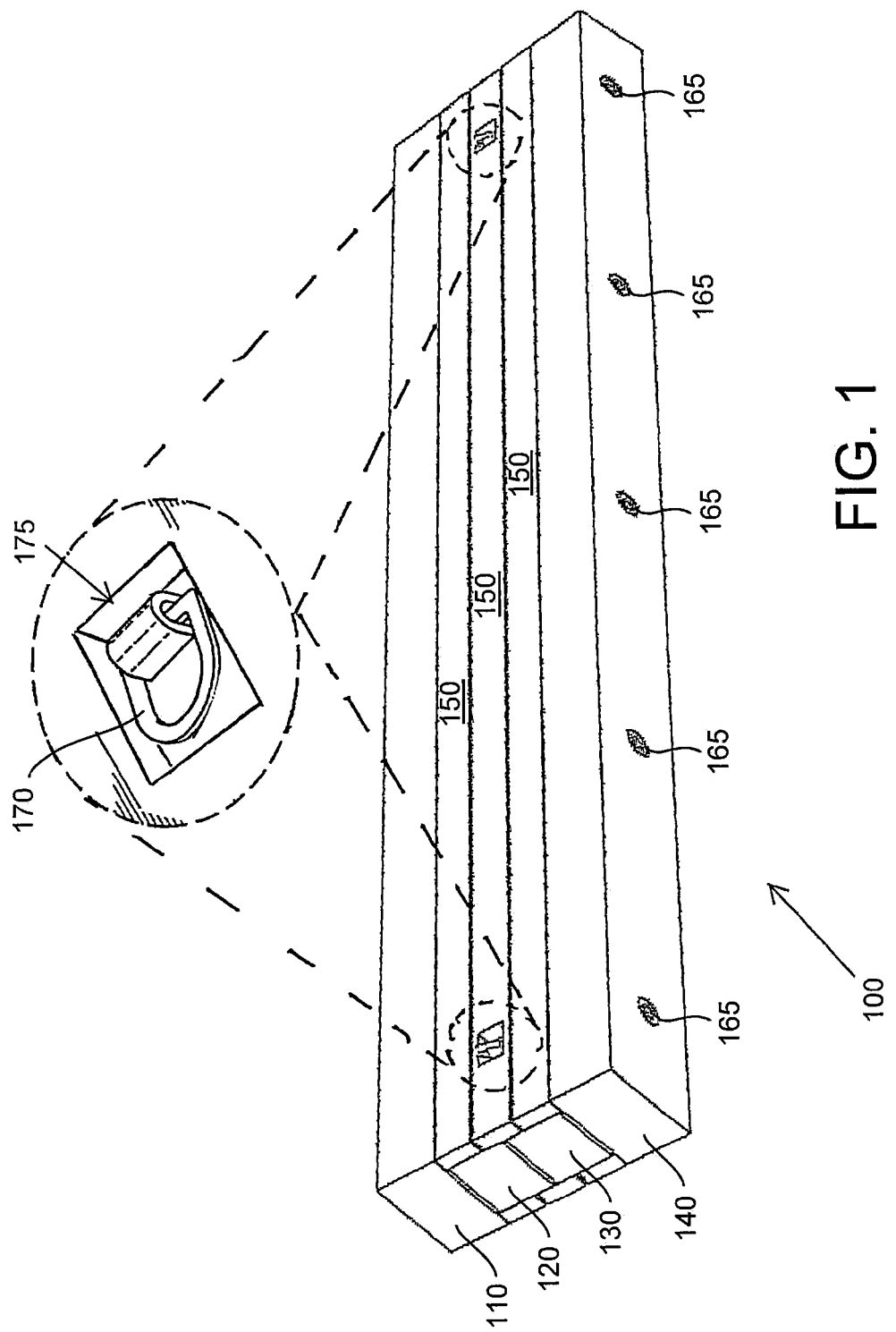
FIG. 1 is a perspective view of a first embodiment of a crane mat having new lifting elements according to the present invention.

The new and improved crane mats of the present invention now provide a number of surprising advantages over conventional crane mats. The provision of one or more lifting elements that are securely attached to these mats facilitates overhead lifting and manipulation of the mats in a much more secure manner. By securing the lifting element directly to the joining rod of the mat, the weight of the mat becomes directly distributed from the mat onto the joining rod to the lifting element. Prior crane mats included a large opening to expose the joining rod to enable a crane hook to access the rod for lifting. The provision of the lifting elements of the present invention now provides much smaller recesses and openings compared to conventional crane mats to avoid having workers operating on the upper surface of the mat from tripping over or stepping into the hole. In addition, the recesses and holes are sized and configured to receive the lifting element when not in use to provide essentially a flat in uniform top surface of the mat in the area where the lifting element is located, yet still allow the loop portion of the lifting element to be simply and easily accessed and exposed when the mat needs to be moved. The lifting element is provided in line with the mat working surface or preferably slightly below it.

Another advantage of the present invention is that the lifting element is configured such that when the loop portion is exposed above the working surface of the mat, it also can be used to tie down equipment, tents, or other items to the mat to stabilize and secure such items to prevent movement during use.

Certain terms that are used herein are defined hereinbelow to assist in the understanding of the invention.

The term "crane mat" is intended to cover relatively large mats made primarily of longitudinal beams or timbers having widths of at least about 4 feet with lengths running from about 4 feet to 40 feet and incorporating elongated members, beams, or other components having square or rectangular cross sections of sizes of at least about 6×6 to 24×24 inches with lengths from about 4 feet to as much as 40 feet or more. Preferred dimensions are described throughout the specification. As noted, previous and current mats of this type that are commercially available are primarily constructed of monolithic wood and typically of oak.

The term "non-wood" to describe the longitudinal beams or the support structure is used for its ordinary meaning. The components of the structure are generally not made of wood but instead are made of metal, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially' will mean that the top surfaces of the beams and elongated members can vary by as much as a few inches although in the more preferred embodiments the variance is less than 1 inch.

Additionally, all dimensions recited herein are approximate and can vary by as much as ±10% to in some cases ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The outer top and bottom surfaces of the mat are deemed to be the working surfaces of the mat. Generally, the mat can have different upper and lower surfaces recognizing that one surface faces the ground while the other is used as a road, platform or other working surface, but preferably, the upper and lower surfaces are the same so that either surface can be faced downward with the opposite surface used for supporting equipment or allowing movement on the mat. Also, the surfaces are preferably made with symmetry as to the lifting elements to facilitate efficient lifting of the mats.

The mat is typically made of longitudinal members having a rectangular cross-section with all members having the substantially the same dimensions. In an alternative embodiment, some or all of the beams can be made smaller than the desired thickness of the mat and can be protected on their top and bottom surfaces by elongated members of boards or other structural components. These beams are typically made of lower cost materials having sufficient strength for use in the mat but that may not have sufficient ruggedness for the intended use of the mat. In this arrangement, the protective members and components are selected to provide better impact and abrasion resistance than the smaller beans such that the strength of the beams can be obtained with mat surfaces that are more resistant to the movement and placement of equipment across or onto the mat.

In a preferred embodiment, the beams are made of wood with oak or other hardwoods being preferred. For the embodiments where the upper and lower surfaces are protected by boards or other elongated members or components, the beams can be made of pine or other softwoods and the boards can be made of oak or other hardwoods, plastics, elastomers or even metal. The beams and outer boards can each be made of materials that are not wood if desired. Accordingly, the invention provides many different materials and combinations that can be used for different applications.

When the longitudinal beams are made of non-wood materials of metals, plastics or elastomers or combinations thereof, timber resources are conserved rather than being harvested to provide the long length beans for construction of the mats. It is possible to use wood only for the outer side beams with a support structure providing the remaining width of the mat. For the arrangements where the beams are of smaller dimensions than the thickness of the mat, further conservation of wood resources is achieved with the inner beams protected by upper, lower or upper and lower layers of elongated materials of any of the materials mentioned. This is particularly advantageous when the smaller beams are made of pine or other softwoods with the upper and/or lower layers of one or more boards, plates or other elongated members being made of a more durable material to protect the softwood beams that are used in the core of the mat.

And other variations are possible. The side beams can be made of a plastic, elastomeric or metal materials. These are generally rectangular in cross section and have a height that is the same as the overall thickness of the mat.

When the smaller beams in the core are protected by the upper and lower layers of other boards the working top and bottom surfaces of the mat are configured to be substantially uniform. In one arrangement, the top or bottom surfaces of the mat includes the top or bottom surfaces of the side beams and of the boards that protect the core beams. And in other arrangements, all beams can be of the same height with the upper and lower layers of boards covering all beams. In this arrangement, the top and bottom surfaces of the mat are the top and bottom surfaces of the protective boards.

A preferred embodiment uses fiberglass reinforced thermosetting resins, generally in the form of a pultrusion, for the side beams, all internal beams or the support structure, and for the elongated members essentially eliminates the use of any wood in the mats. This further conserves timber resources.

The use of a non-wood core or support structure enables that component to be reused in the event that the side beams or elongated members become damaged or experience deterioration due to use and exposure to harsh environmental conditions. By being made of more robust and environmentally resistant materials, it is possible to disconnect the joining rods to take apart the mats and remove the damaged side beams or elongated members, and then add new components to the structure to form a new mat. This also reduces the demand for wood beams or elongated members in particular by 50 to as much as 100%.

The mats of the invention typically include a plurality of longitudinal beams having top, side and bottom surfaces, with the beams having width and height dimensions of between 6×6 inches and 24×24 inches and a length of at least 4 feet and typically between 10 and 60 feet. Preferably the lengths of the beams are in the range of 20 to 40 feet and preferably 30 to 40 feet as these length mats are easier to transport and ship compared to longer mats. Other dimensions that are typically used for the side beams are 8×8, 10×10, 12×12, 14×14 and 16×16 although a skilled artisan can select other dimensions as desired.

Typically, the widths and heights of the beams are of the same dimension so that the beams have a square cross-section. Alternatively, for certain designs, the beams may be rectangular in cross section, with the width being about twice the dimension of the height or vice versa. Other typical dimensions are 6×12, 6×18, 8×10, 8×12, 12×14, 12×16, 12×24, and 18×24. These rectangular beams may be connected to the support structure with the longer side as the height or with the longer side as the width, depending upon the desired use of the mat. Using the longer side as the width is generally preferred for interlocking mat arrangements.

The beams are typically made of any type of wood with oak being the most preferred. They may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

Engineered lumber (or engineered wood) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:

parallel strand laminate (PSL), which is a beam that can be manufactured up to about 12×12 inches in any length due to the production of the beam by a continuous process;

layered stand laminate (LSL), which is a billet that can be made at thicknesses of from about 1" to 4", in widths from about 2 inches to 54", and in lengths of about 8 feet to 64 feet; and layered veneer laminate (LVL) which is also a billet that can be made up to about 4 feet square by any length.

Alternatively, the beams may be made of a fiberglass reinforced thermosetting plastic material such as fiberglass reinforced polyester or epoxy resins. These materials may be pultruded into a solid form or preferably as a rectangular or square tube. If desired, hollow tubes can be filled with any one of a variety of materials to contribute to the overall strength or compression resistance of the tube. Typically, crumb rubber, recycled tires or other plastic or elastomeric materials, sand, crushed rock or polyurethane foam may be provided inside the tube either before or after attachment to the support structure. A polyurethane foam is preferred for this purpose as it can be injected in a liquid form after the pultrusion is attached to the support structure. For stronger or heavier filler, the joining rods may be initially placed into the beam so that the filler does not block the insertion of the rods when joining the side beams to the support structure. Additionally, a metal or pultruded plastic tubular sleeve can be provided in the beams at the locations where the rods are to be inserted, so that the rod has an opening that remains after the filler is placed into the beams.

While the beams are typically made of wood, as noted other materials may instead be used. When the beams are made of metal, steel is typically used as that material is readily available and of low-cost. Although not necessary for most applications, the beams can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture. It is preferred than the metal be weldable to facilitate construction of the beams.

Aluminum or titanium can also be used for the beams in specialty applications. All of these materials generally have higher cost than steel and some present greater difficulties during welding or brazing.

The metal beams are typically provided as square or rectangular tubular structures or as a plurality of plates. These members can be prepared in the desired shape and configuration by welding smaller shapes or segments together.

Alternatively, the beams may be made of a fiberglass reinforced thermosetting plastic material resin, which is typically a polyester or epoxy resin. The components of the structure may be pultruded in the form of a rectangular or square tube which may be hollow or filled with other materials depending on the overall weight and compressibility desired for the construction.

The plastic or elastomeric materials can be used either as solid rectangular structures or as layers. Depending upon the anticipated service and conditions to be experienced, different combinations of beam materials can be used. Thus, the invention provides a wide range of different beam materials and material combinations that can be selected for any particular end use or service requirement for the mat.

The mat must also provide sufficient load bearing capacity: a fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and psi to possibly as much as 1000 psi depending upon the application and when properly installed on a suitably prepared ground surface. This provides resistance against compression as large vehicles or equipment move over or are placed upon the mat.

A plurality of joining members are used to secure the beams together. These joining rods are typically large rods or carriage bolts that include threaded ends to receive nuts that when assembled will hold the components together. These rods are spaced about 3 to 6 feet apart depending upon the size of the mat. These rods or carriage bolts are typically made of a high strength steel.

A wide variety of lifting elements can be provided. Typically, the lifting element can include D-shaped members, O-shaped members, U-shaped members, eyelets, hooks, circular or polygonal rings, chains, or cables. These elements generally have a unitary structure that can provide the necessary strength and versatility in allowing the mats to be certified for overhead lifting to facilitate pick up, delivery, installation and reclamation of the mats. Each lifting element has a strength rating of from ½ ton to 12 tons depending upon the size of the mat.

All of the elements have a component that includes a loop portion that is generally an opening or open area in the lifting element that can be grasped by a hook or other member of a crane or similar lifting device. The elements also include a further securement portion, again in the form of an opening or open area that allows the lifting element to receive a joining rod therethrough so that the lifting element is securely attached to the mat.

The number of lifting elements can vary based on the size of the mat. At least one lifting element is provided on each of the top and bottom surfaces of the mat when symmetrical mats having the same top and bottom surfaces are provided. It is also possible to have two lifting elements in the center of the mat near each end as shown in FIG. 1. Greater numbers of lifting elements can be used with 4 or even 8 or 12 lifting elements on each surface of the mat. These can be arranged symmetrically in the mat surface to facilitate access by the lifting device.

The lifting elements are located in recesses which can be provided between adjacent beams or if desired, within the beams. As noted, the recesses can be arranged horizontally and parallel to the working surface of the mat, or vertically and perpendicular to the working surface of the mat. The specific arrangement is determined based on the type of lifting element that is to be used. Additionally, the recesses can be provided in adjacent beams while also located in or over the spacing between the beams.

In the most preferred arrangement the recesses are rectangular in configuration and shape but other configurations and shapes can be used. For example, sloped walls of the recess can be provided to create a V shape for the vertical embodiment while the horizontal embodiment can vary based on the shape of the support plate and can be round, oval or other polygonal shapes other than rectangular or square.

To prevent movement of the lifting element in the horizontal embodiment, the support plate can include a number of openings for nails, bolts or screws to more firmly attach the lifting element to the mat. The support plate can include 2, 3, 4 or more openings depending upon the size of the mat and lifting element. These help prevent any movement of the lifting element during movement of the mat except of course of the loop member.

The preferred embodiments for the lifting elements include a D- or O-shaped member that can pivot from a horizontal position, where it can be stored beneath the working surface of the mat, to a lifting position where the D- or O-shaped member is exposed for grasping by a hook member of a crane or other equipment. Other rings or plate members that have arcuate ends or edges and that include the appropriate opening or openings can be used.

Other suitable lifting elements includes chains one end of which is secured or attached to a joining rod and the other end of which includes a chain link or other loop portion for engaging a crane hook for lifting of the mat. The chain is retained in the recess when in the storage position. The chain is configured of steel having sufficient strength to be able to lift the entire mat without bending or breaking. Also, the links at either end of the chain can be securely attached to the joining rod when the mat is assembled.

In a preferred arrangement, only one end of the chain is permanently secured to the joining rod, while the other is attached by a conventional connectable link. Thus, after the mat is moved into position, the chain can be disconnected and stored inside support structure so that personnel working on the mat will not trip over the chain.

Alternatively, if a removable chain is desired, such as may be supplied with the equipment used to move the mats, the chain can be provided with a connectable link on each end so that the workers can attach each end of the chain to the joining rod when the mat is to be moved. After the mat is installed, however, the chain can be removed from the joining rod and reused for moving or installing other mats. This again provides greater safety for workers as the chains are not present on the surface of the mat during use.

For additional safety, the size of the opening that receives the chain is reduced compared to mats of the prior art. As the opening provided for connecting the chain is much smaller than the previous opening or cut away beam that exposed the joining rod, personnel who are working or conducting operations upon the mat have a much lower chance of stepping into hole.

Instead of a chain, a suitable cable can be provided. This is often constructed of metal strands for greatest strength. Also, when cables or chains are to be used, they should have at least three drop forged clamps. Cable can be new ¾ inch steel core, extra improved plow (EIPS), right regular lay wire rope, having a minimum breaking strength of over 29 tons. Chains should be ⅜" high test chain, having a working load limit of 5400 lbs. and a minimum breaking strength of 16,200 lbs. with ⅜ inch double clevis links, in order to provide a safe working load limit of about 5400 lbs.

Turning now to the drawings, FIG. 1 illustrates a crane mat 100 in accordance with the present invention. For this embodiment, the crane that includes side beams 110, 140 of oak or other hardwood and internal beams 120,130 made of softwood such as pine timbers to reduce the overall cost of the mat. As these pine timbers are not as abrasion and abuse resistance as other materials or components, they are protected on all sides by one or more different mat components, shown in this drawing as elongated members or boards 150. The pine timbers are configured to be shorter than the longitudinal oak beams with the upper and lower surfaces of the pine timbers protected by more durable elongated members, which can be made of oak or other hardwoods, plastic or elastomeric members or even metal. And instead of multiple elongated members, a single plate or sheet of steel, wood, plastic or elastomeric material can be used.

In an optional embodiment, a steel or metal plate 105 can be placed between each adjacent pine timbers as well as between the oak beams and the adjacent pine timbers to further strengthen the mat. The present invention is also operable without these plates.

Figure 5:
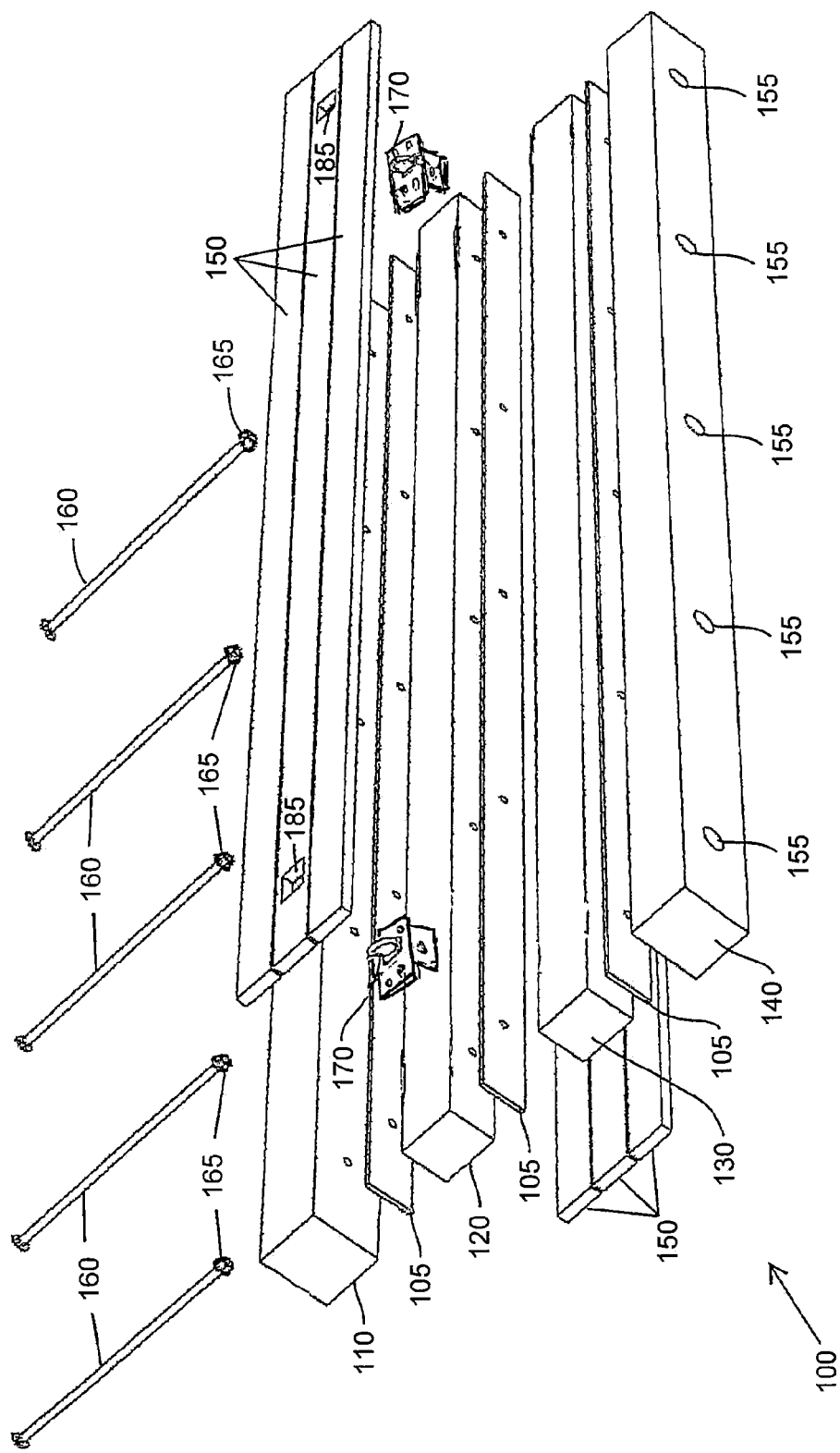
FIG. 5 is an exploded view of the mat of FIG. 1 to illustrate the various components present therein.
Figure 6:
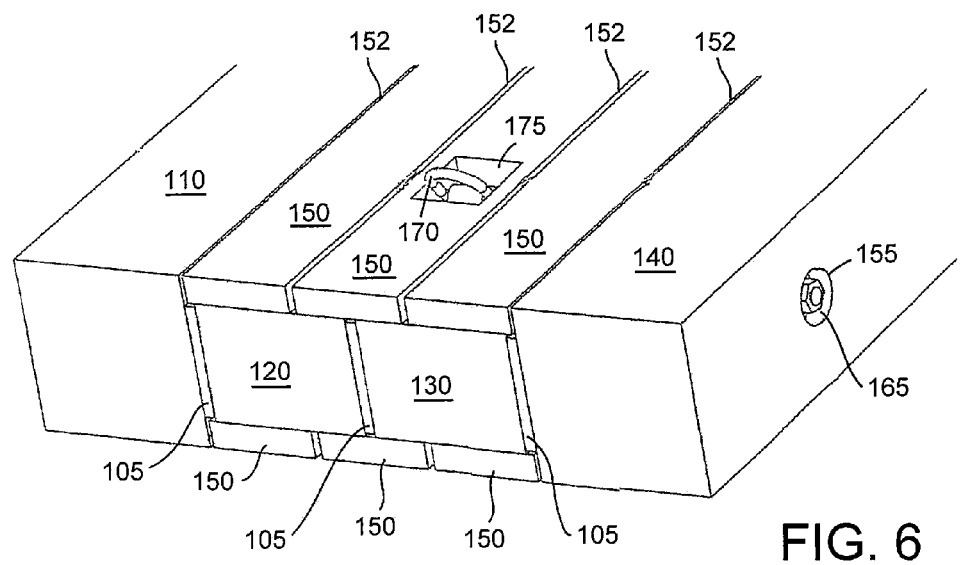
FIGS. 6 and 7 are expanded views of the front end of the mat of FIG. 1 to illustrate certain component details.
Figure 7:
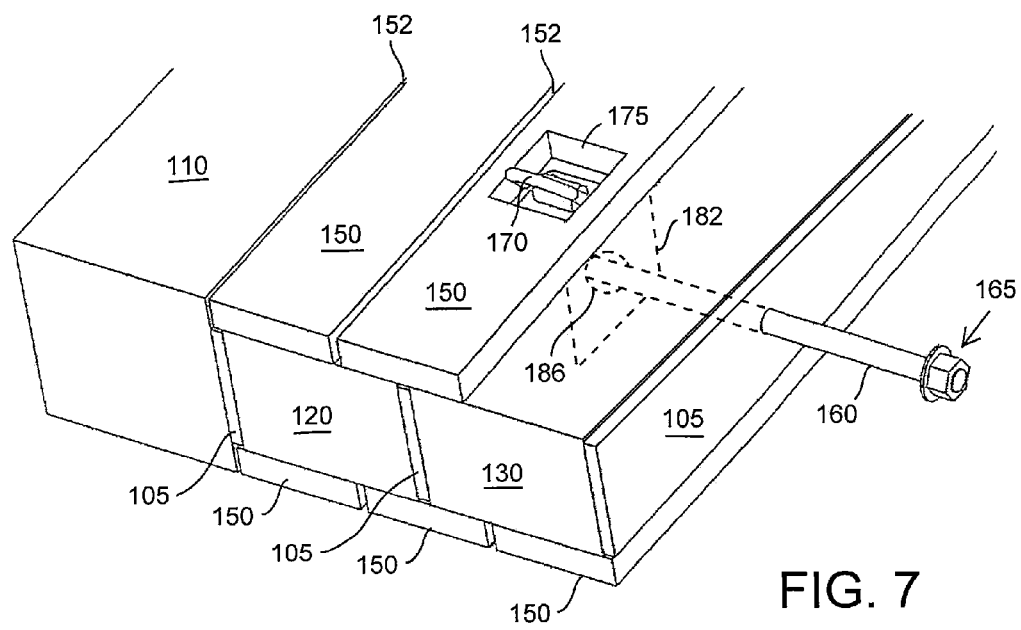

All mat components and their arrangement in the mat are more clearly illustrated in FIGS. 5-7. This crane mat 100 includes two side beams 110, 140 which are made of white oak and which have dimensions of about 12×12 inches and a length of approximately 16 feet. The core of the mat is made primarily of three pine timbers, 120, 130, which have dimensions of approximately 12 inches wide and 8 inches high. The pine timbers are located adjacent the center of the height of the side beams such the side beams extend approximately 1 to 2 inches above and 1 to 2 inches below the pine timbers. To prepare uniformly flat upper and lower surfaces of the mat, boards 150, each of which is approximately 2 inches thick, 8 inches wide and 16 inches long, are provided above and below the pine timbers as shown. The boards can be made of wood, engineered lumber, plastic or recycle materials. The oak beams and boards thus protect the pine timbers from abuse while reducing the cost of the mat due to the substitution of the pine timbers for oak timbers. And when these boards 150 are spaced apart, channels 152 are formed between them which allow water to drawing from the mat during use.

And although the pine timbers are exposed at the forward and rearward ends of the mat, these are not usually subjected to great abuse. Additionally, if desired, bumper members as disclosed in the prior applications that are incorporated by reference herein can be provided on the forward and rearward ends of the mat to provide further protection of the ends of those pine timbers.

The side beams, pine timbers and when used the steel plates are joined together by joining rods or carriage bolts 160 which extend across the width of the mat. A number of joining rods or bolts are used spaced every 3 to 6 feet of length of the mat. The bolts pass through each of the beams and timbers and when used the plates and are secured in placed by a washer and nut arrangement 165. The upper and lower boards 150 are either nailed or bolted to the pine timbers.

Figure 2:
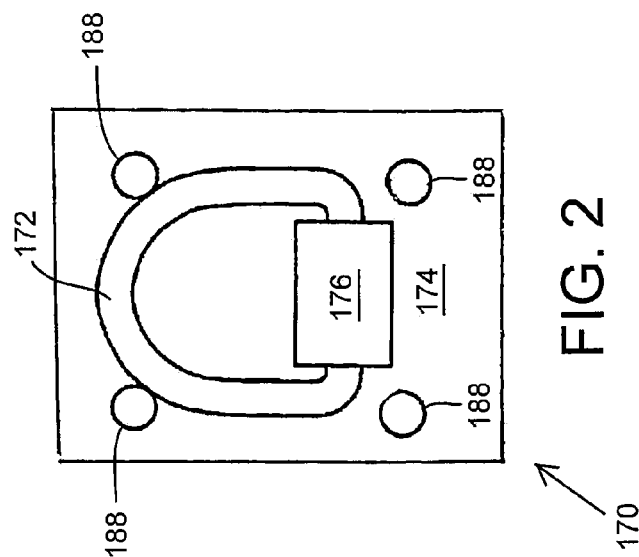
FIG. 2 is a top view of one of the lifting elements present on the mat of FIG. 1.
Figure 4:
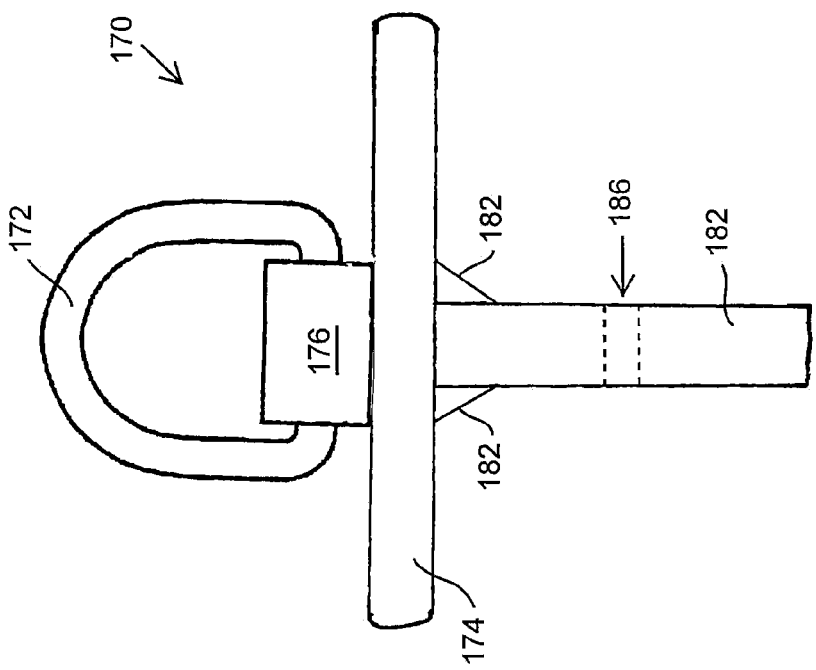
FIG. 4 is a front view of the lifting element of FIG. 2.
Figure 3:
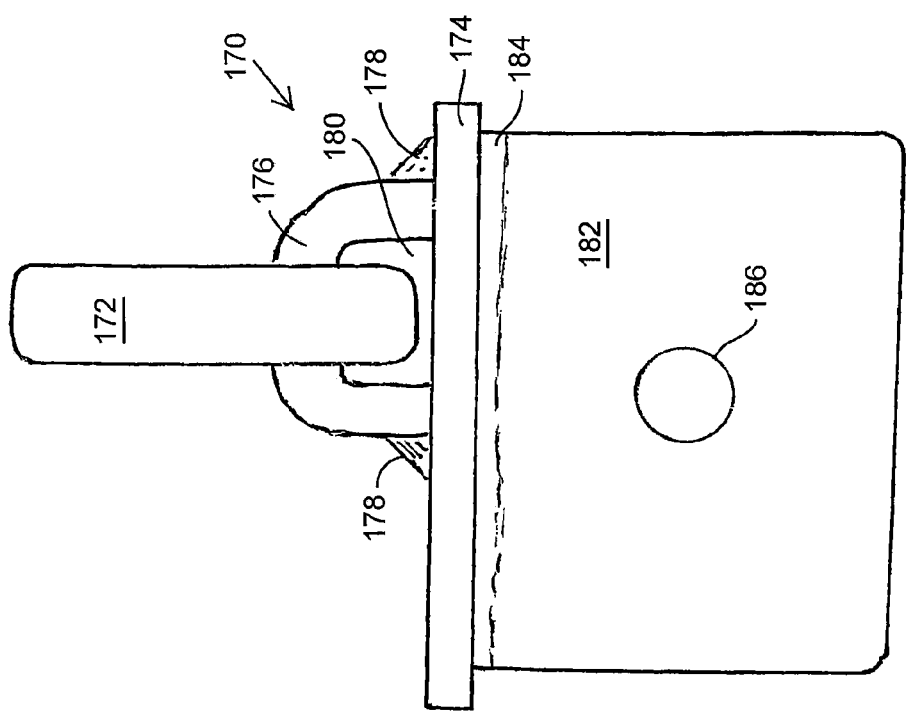
FIG. 3 is a side view of the lifting element of FIG. 2.

To facilitate lifting of the mats, a lifting element 170 according to the invention is provided. This element is best shown in FIGS. 2-4. A D-shaped ring 172 is provided that is pivotally attached to a steel support plate 174 by way of a U-shaped channel member 176 that is welded 178 to the steel support plate 174 to provide space 180 to facilitate the pivoting movement of the ring 172. The lifting element 170 also includes a base plate 182 that is arranged perpendicular to the support plate 174 and that is welded 184 thereto. The base plate includes an aperture 186 that receives the support rod 160 to secure the lifting element to the mat. This lifting element is provided in a recess 175 that is present in the center board 150 and that extends onto the upper sides of the pine timbers 120,130 while the base plate extends into the spacing between those pine timbers to reach the point where the support rod 160 passes through the pine timbers. The plate is accommodated in the pine timbers by the slot 175 into which the plate can be seated. To further prevent movement of the lifting element during use, four holes 188 are provided in the support plate to receive nails or screws that secure the support plate to the timbers. This provides a very secure connection that allows overhead lifting of the mat for installation or removal as well as to facilitate loading or unloading of the mats on a truck or train bed.

The D-shaped ring of lifting element 170 is provided in an opening or recess 175 in the center board in such a way that when not used to lift the mat, the D-shaped ring lies flat in the opening so as to not hinder movement of personnel over the mat. And while the two lifting elements are shown on the upper surface of the mat, it is advantageous to also provide the same arrangement on the lower surface of the mat. Furthermore, the number and precise location of the lifting elements is not critical but can be selected by a skilled artisan depending upon the overall size and weight of the mat.

Generally, one lifting element is located on a lateral rod at the center of the mat nearest one end and another lifting element is located on a lateral rod at the center of the mat nearest the opposite end. It is also possible to utilize four lifting elements, two spaced lifting elements on the lateral rod nearest the first end of the mat and two other spaced lifting elements located on a lateral rod nearest the opposite end of the mat. These can be provided between beams 105 and 110, and between beams 115 and 120 of FIGS. 1 and 5-7. While four lifting elements are sufficient in most cases, higher numbers can be used if desired. Preferably, the lifting elements are arranged and located symmetrically on the working surface or surfaces of the mat.

Figure 8:
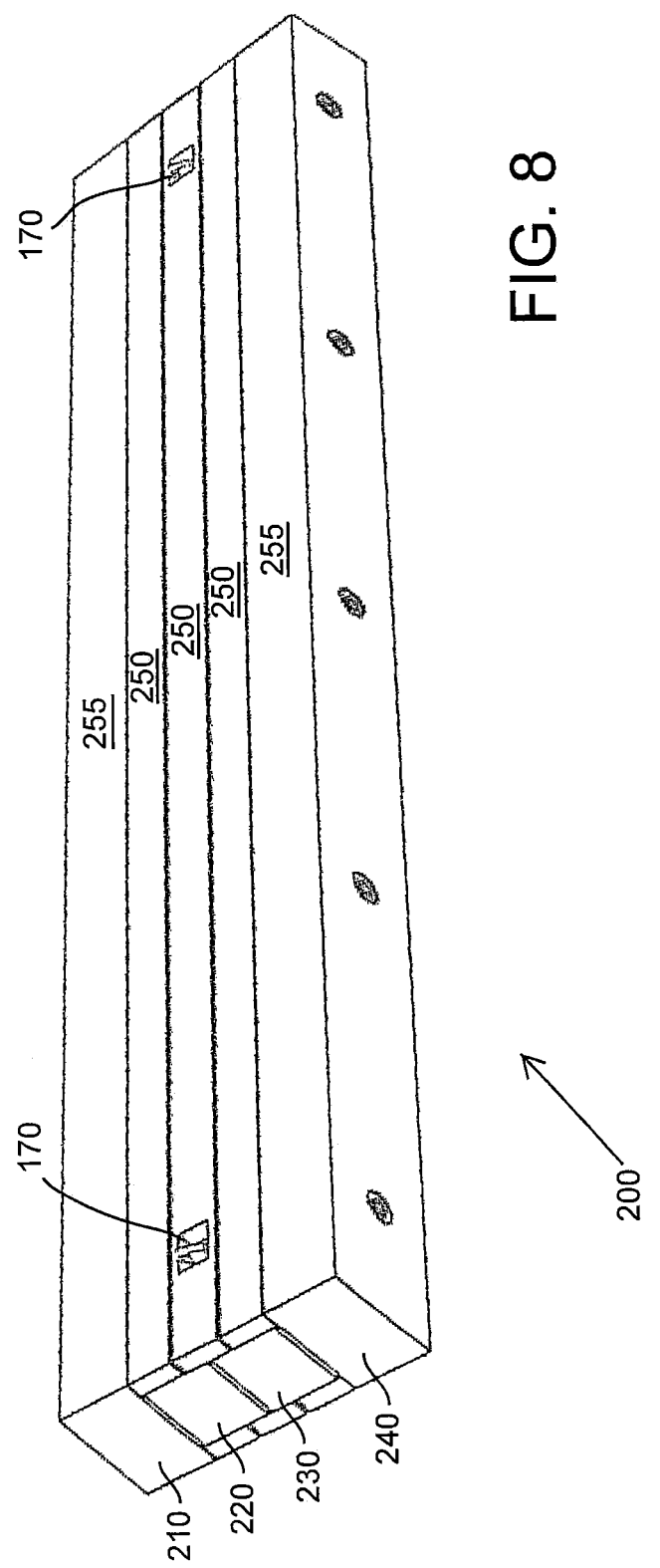
FIG. 8 is a perspective view of a variation of the mat of FIG. 1.

FIG. 8 illustrates a variation of the mat of the previous embodiment although the same lifting element 170 is used as in FIGS. 1-7. In FIG. 8, mat 200 has four pine timbers 210, 220, 230, 240 that have upper and lower surfaces protected by elongated boards 250, 255. Boards 250 are the same as boards 150 in FIGS. 5-7 and are smaller in width than pine beams 220, 230. Boards 255 have the same width as pine beams 210, 240. While the upper and lower surfaces of the mat are formed by the upper and lower surfaces of the boards 250, 255, this example illustrates that the width of the boards that are used can vary as desired. And as previously noted, a single plate or sheet can be used instead of multiple boards if desired. The use of multiple boards however is preferred because if a particular board is damaged it can be replaced rather than having to replace an entire unitary sheet or plate that covers the entire top or bottom surface of the mat. In some situations, however, a plate of steel or unitary plastic or elastomeric material layer can provide additional advantages when covering the entire surface on the top or bottom of the mat.

In FIGS. 1 and 5-8, the bottom surface of the mat is not shown, but the mat is preferably made with the same structure on both surfaces so that either one can be used as the upper surface of the mat that is to receive equipment or vehicles thereon. While this facilitates installation in that there is no requirement for placement of the mat in a particular orientation, it also allows the installer to select the surface of the mat that is in better condition to be used as the upper surface of the mat.

FIG. 9 illustrates a crane mat 300 comprising a plurality of a plurality of longitudinal beams 305, 310, 315, 320 that are positioned in a side by side arrangement. Each of the beams has a plurality of spaced lateral apertures 325 passing therethrough, with the lateral apertures being in alignment to form bores through the mat, with each bore receiving a lateral rod or carriage bolt 330. One such aperture 325 is shown with the lateral rod 330 passing therethrough and locked in place by a nut 335 to hold the beams together in the side by side arrangement.

The mat is provided with at least two lifting elements each located in an opening in one of the beams, typically at each end of the mat. Alternatively, for wider mats, two spaced lifting elements can be provided at each end of the mat. Each lifting element 340 is in the configuration of an eyelet. The lifting element 340 has a body 345 with a first end thereof 350 having a securement portion in the form of an opening 355 for receiving and connecting to the lateral rod 330 and a second end 360 having a loop portion 365 that acts as grasping means for a hook or connecting element of lifting equipment to engage the loop portion for lifting and manipulation of the mat. The loop portion 365 is an aperture in the second end 360. Instead of an aperture, the loop portion can be a hook element or J- or L-shaped bar that can engage a mating connecting element on the lifting equipment.

The body 345 is typically a flat plate that preferably has rounded edges but it also can be a bent or angled member that near one end has the necessary aperture to receive the lateral rod therein for attachment to the mat, and on the opposite end includes the aperture or other loop portion. In some cases, a chain or cable can be used instead of the flat plate with the chain or cable passing around the rod and out of the aperture to be engaged by the lifting equipment. The flat plate is preferred because it is compact and requires a smaller hole than a chain or cable.

A vertical recess 375 having a flat bottom surface 380 is configured and dimensioned to hold and maintain the lifting element 340 therein in a first retracted or storage position as shown in FIG. 10A when not in use and to allow retrieval and removal of the second end 360 of the lifting element from the opening 375 to a second operative position that exposes the loop portion 365 to allow grasping when the mat is to be lifted or manipulated, as shown in FIG. 10B. The opening 375 is either positioned at an end of the mat so that it is open at that end as shown or has a sufficient volume to allow a user to reach therein to grab and move the loop portion 365 from the retracted position to the operative position.

The lifting element 340 shown in FIGS. 9 and 10 is spaced from the end of the mat by a few feet, e.g., 1 to 3 feet. To provide access to the lifting element, the opening in which the element resides is elongated so that it extends from the point where the lifting element is present all the way to the end of the mat. This provides access to the lifting element to remove it from its retracted position, which is shown in FIG. 10B, to an operative position as shown in FIG. 10A. Again, the lifting element 340 has an arcuate first end to allow the lifting element 240 to more easily pivot about the joining rod 330 between those positions.

And although the opening 375 is illustrated as being much longer than the length of the lifting element, it is also possible to simply widen the opening about the retracted lifting element rather than have a thinner opening that extends to the end of the mat. The configuration of the openings 375 should simply be sufficient to allow an operator to be able to reach in and grab the lifting element to raise it to its operative position. When the opening is placed further back in the mat, it is generally widened to allow the hand of the operator to reach into the opening.

Figure 11A:
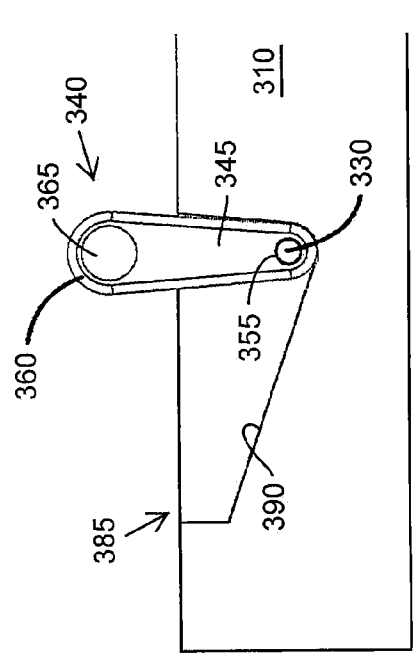
FIG. 11 is presented as FIGS. 11A and 11B which are a partial sectional views of a variation of the mat of FIG. 9 with the lifting element in operative and storage positions respectively.
Figure 11B:
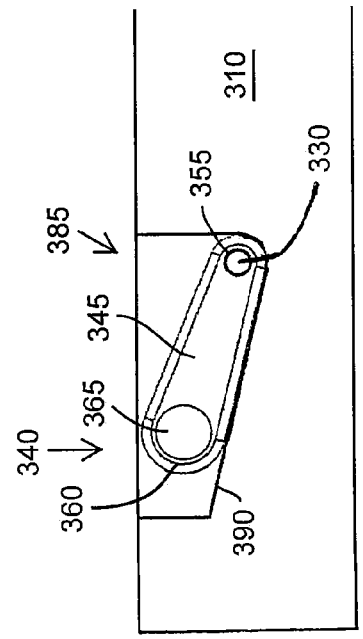

FIGS. 11A and 11B illustrate a variation of the lifting element of FIGS. 10A and 10B. The lifting element features are the same as in FIGS. 10A and 10B, but the vertical recess 385 is configured with a sloped bottom wall 390. This enables the recess to be of overall smaller size while still retaining lifting element 340 below the working surface of the mat. Also, the recess 385 does not need to extend to the end of the mat.

A number of variations of the lifting element of FIGS. 10 and 11 can also be used in the present invention. Instead of two holes separated in the plate as shown for lifting element 340, a single, larger hole can be provided in the plate. The open center plate can be used on smaller sized mats where the overall lifting element does not need to be as long as lifting element 340 of FIGS. 10 and 11. It is possible to obtain a metal or steel stamping in the desired shape and thickness which will look like that of FIGS. 10 and 11 in that it will have the same outer circumference and size without the body portion 345 between the two openings—in effect being a single larger opening.

And for certain mats, it is possible to instead use a ring that is made of a metal, preferably steel, bar of cylindrical or rectangular cross-section that is configured in the shape of a ring with the ends of the bar welded together. This ring can be shaped as shown in FIGS. 10 and 11 with a similar outline to the shape of those lifting elements, or it can be made as an oblong, oval, elliptical or circular ring. These non-linear shapes are preferred as they are easy to manipulate with respect to removing a portion of the ring from the slot for use when the mat is to be moved, as well as to allow the ring to fall back into the slot into the storage position after the mat is installed and in use. A shape other than circular is preferred, however, as it will more easily fit within the vertical recess 385 that is configured as shown in FIG. 11. The shape of the ring would be selected based on the thickness and overall weight of the mat. This will also be used to determine a suitable thickness for the plate embodiment of FIGS. 10 and 11 or for the diameter or circumference of the cylindrical or rectangular rod that is shaped as a ring.

To avoid the lifting element damaging the wood sides of the slot or recess, the edges of a rectangular bar or plate can be rounded. Alternatively, the slot or recess can be lined with a plate preferably of metal in areas where contact by the lifting element during movement of the mat is expected. Such a construction requires additional time and labor to configure the slot or recess so that the collar embodiment is preferred. A metal collar that can be used to protect the opening in the mat from damage due to contact with the lifting element is described as element 1302 in U.S. patent application Ser. No. 15/244,614 in FIGS. 6 and 7. This collar protects against contact and abrasion from the lifting element when lifting the mat. Alternatively, other replaceable structure of metal or other materials can be used to protect the sides of the opening.

For any of the embodiments that are used with the slot of FIG. 11, the angle of the sloped bottom wall is sufficient to allow the lifting element to fall back down under its own weight into a position where it does not protrude above the working surface of the mat. And when the lifting element is to be used for receiving a hook of a crane or other heavy equipment device, a worker can simply reach into the slot and pull up the lifting element to expose an opening or hole that the hook can engage to then move the mat.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. A crane mat having overhead lifting capability, comprising:

a plurality of a plurality of longitudinal beams that are positioned in a side by side arrangement; each of the beams having a plurality of spaced lateral apertures passing therethrough, with the lateral apertures being in alignment to form bores through the mat;

a plurality of joining members with each member passing through each beam through the aligned lateral apertures to hold the beams together in the side by side arrangement;

an upper layer provided above the longitudinal beams for forming an upper working surface of the mat, or a lower layer provided below the beams for providing a lower working surface of the mat, or both upper and lower layers; and one or more lifting elements each located in an opening that is at least partially present in one of the upper or lower layers and beams to facilitate moving or manipulation of the mat, with the lifting element(s) comprising:

a loop portion that is configured with an opening sufficient to receive and allow grasping by a hook, fingers, hand or other lifting member, and a securement portion that includes an opening sufficient to receive a joining member therein, with the loop and one or more securement portions either connected to each other or forming a unitary lifting element, and with a joining member passing through the securement portion to attach the lifting element to the mat;

wherein the respective upper and/or lower layer(s) and at least part of a subjacent beam member are configured to provide an opening or recess configured and dimensioned to receive the lifting element therein in a storage position with the lifting element maintained at or below the working surface of the mat when not used for lifting or moving of the mat or when securing articles thereto;

wherein one securement portion comprises a support plate; an attachment member for attaching the loop portion to the support plate; and a base plate that includes the opening for receiving the joining member; and wherein the loop portion is movable to a lifting position that exposes the loop above the working surface of the mat for engagement by a hook or other grasping element for lifting, manipulation or movement of the mat or for securing other articles to the lifting element.

2. The crane mat of claim 1 wherein the joining member comprises a rod or carriage bolt; and wherein the longitudinal beams have a rectangular cross section with width by height dimensions of between about 6 by 6 inches to about 24 by 24 inches and a length of between about 4 and about 60 feet; and are made of wood, metal, plastic or elastomeric materials that are solid; hollow and unfilled or filled with other materials; or are composed of layers oriented so that the lateral apertures and joining members pass through each layer.

3. The crane mat of claim 1 wherein the loop portion comprises a D-shaped member, an O-shaped member, a U-shaped member, an eyelet, a hook, a portion of a circular or polygonal ring, chain link, or cable that has sufficient strength to provide certified overhead lifting of the mat for installation and reclamation thereof.

4. The crane mat of claim 1, wherein the recess is a vertically arranged slot that is configured to receive the component with the loop portion below the working surface in the storage position, wherein the loop portion can pivot to the lifting position to expose the loop portion above the mat working surface.

5. The crane mat of claim 4, wherein the slot has a rectangular shape and a flat or sloped bottom wall upon which the elongated unitary member rests when in the storage position.

6. The crane mat of claim 1, wherein the loop portion is a D or O shaped ring and the attachment portion is a U-shaped member attached to the support plate and having a sufficient opening to allow the loop portion to pivot between the storage and lifting positions.

7. The crane mat of claim 1, wherein the support plate is oriented and positioned to be parallel to but beneath the working surface of the mat, the attachment member is located on an upper surface of the support plate, and the base plate is attached to a lower surface of the support plate and is oriented perpendicularly thereto, wherein the lifting element is made of steel or another metal, and with both the attachment member and base plate welded to the support plate.

8. The crane mat of claim 1, wherein the recess is horizontally configured recess provided beneath the working surface of the mat upon adjacent longitudinal beams with the base plate extending in the space between the beams, wherein the recess has a depth that is greater than the combined thickness of the support plate, attachment member and loop member so that the lifting element resides beneath the working surface of the mat when in the storage position.

9. The crane mat of claim 1, wherein between 2 and 12 lifting elements are provided in a symmetrical pattern, and the openings or recesses for at least two of the lifting elements are spaced about 1 to 3 feet from the front or rear ends of the mat.

10. The crane mat of claim 1, wherein the upper and/or lower layers are independently made of one or a plurality of elongated members that cover the entire working upper and/or lower working surface of the mat.

11. The crane mat of claim 10, wherein the longitudinal beams are made of pine or other softwoods and the elongated members are made of wood, engineered wood, metal, or a plastic or elastomeric material.

12. The crane mat of claim 10, further comprising a longitudinal bumper member adjacent an exposed side of first and last longitudinal beams, with the elongated members of the upper and/or lower layers configured and dimensioned to also cover and protect the longitudinal bumper members.

13. The crane mat of claim 11 further comprising longitudinal steel plates between adjacent longitudinal beams.

14. A crane mat having overhead lifting capability, comprising:

a plurality of a plurality of longitudinal beams that are positioned in a side by side arrangement; each of the beams having a plurality of spaced lateral apertures passing therethrough, with the lateral apertures being in alignment to form bores through the mat;

a plurality of joining members with each member passing through each beam through the aligned lateral apertures to hold the beams together in the side by side arrangement;

an upper layer provided above the longitudinal beams for forming an upper working surface of the mat, or a lower layer provided below the beams for providing a lower working surface of the mat, or both upper and lower layers; and one or more lifting elements each located in an opening that is at least partially present in one of the upper or lower layers and beams to facilitate moving or manipulation of the mat, with the lifting element(s) comprising:

a loop portion that is configured with an opening sufficient to receive and allow grasping by a hook, fingers, hand or other lifting member, and a securement portion that includes an opening sufficient to receive a joining member therein, with the loop and one or more securement portions either connected to each other or forming a unitary lifting element, and with a joining member passing through the securement portion to attach the lifting element to the mat;

wherein the respective upper and/or lower layer(s) and at least part of a subjacent beam member are configured to provide an opening or recess configured and dimensioned to receive the lifting element therein in a storage position with the lifting element maintained at or below the working surface of the mat when not used for lifting or moving of the mat or when securing articles thereto;

wherein the securement portion comprises a support plate; an attachment member for attaching the loop member to the support plate; and a base plate that includes the opening for receiving the joining member, and the loop portion is a D or O shaped ring and the attachment portion is a U-shaped member attached to the support plate and having a sufficient opening to allow the loop portion to pivot between the storage and lifting positions;

wherein the support plate is oriented and positioned to be parallel to but beneath the working surface of the mat, the attachment member is located on an upper surface of the support plate, and the base plate is attached to a lower surface of the support plate and is oriented perpendicularly thereto, with the lifting element is made of steel or another metal, and with both the attachment member and base plate welded to the support plate; and wherein the recess is horizontally configured recess provided beneath the working surface of the mat upon adjacent longitudinal beams with the base plate extending in the space between the beams, wherein the recess has a depth that is greater than the combined thickness of the support plate, attachment member and loop member so that the lifting element resides beneath the working surface of the mat when in the storage position; and wherein the support plate, base plate and recess are configured with a generally rectangular shape, and wherein the support plate includes a plurality of openings therethrough to receive fastening members for attaching the support plate to the recess in the adjacent longitudinal beams.

15. A crane mat having overhead lifting capability, comprising:
   a plurality of a plurality of longitudinal beams that are positioned in a side by side arrangement; each of the beams having a plurality of spaced lateral apertures passing therethrough, with the lateral apertures being in alignment to form bores through the mat;
   a plurality of joining members with each member passing through each beam through the aligned lateral apertures to hold the beams together in the side by side arrangement;
   an upper layer provided above the longitudinal beams for forming an upper working surface of the mat, or a lower layer provided below the beams for providing a lower working surface of the mat, or both upper and lower layers; and
   one or more lifting elements each located in an opening that is at least partially present in one of the upper or lower layers and beams to facilitate moving or manipulation of the mat, with the lifting element(s) comprising:
      a loop portion that is configured with an opening sufficient to receive and allow grasping by a hook, fingers, hand or other lifting member, and a securement portion that includes an opening sufficient to receive a joining member therein, with the loop and one or more securement portions either connected to each other or forming a unitary lifting element, and with a joining member passing through the securement portion to attach the lifting element to the mat;
   wherein the respective upper and/or lower layer(s) and at least part of a subjacent beam member are configured to provide an opening or recess configured and dimensioned to receive the lifting element therein in a storage position with the lifting element maintained at or below the working surface of the mat when not used for lifting or moving of the mat or when securing articles thereto;
   wherein the recess provides a sufficient opening in the mat to expose a portion of the joining member and the lifting element comprise a ring, cable, or chain that receives the exposed joining member, with the recess opening also providing sufficient space to received and maintain the lifting element in the storage position beneath the working surface of the mat, and
   wherein the opening of the recess is reinforced with a metal collar which protects the opening of the recess from contact by the ring, chain or cable and which adds stability as the mat is being lifted or moved.

16. A crane mat having overhead lifting capability, comprising:
   a plurality of a plurality of longitudinal beams that are positioned in a side by side arrangement; each of the beams having a plurality of spaced lateral apertures passing therethrough, with the lateral apertures being in alignment to form bores through the mat;
   a plurality of joining members with each member passing through each beam through the aligned lateral apertures to hold the beams together in the side by side arrangement; and
   one or more lifting elements each located in an opening that is at least partially present in and between adjacent beams to facilitate moving or manipulation of the mat, with the lifting element(s) comprising:
      a loop portion that is configured with an opening sufficient to receive and allow grasping by a hook, fingers, hand or other lifting member, and a securement portion that includes an opening sufficient to receive a joining member therein, with the loop and one or more securement portions either connected to each other or forming a unitary lifting element, and with a joining member passing through the securement portion to attach the lifting element to the mat;
   wherein the respective upper and/or lower layer(s) and at least part of a subjacent beam member are configured to provide an opening or recess configured and dimensioned to receive the lifting element therein in a storage position with the lifting element maintained at or below the working surface of the mat when not used for lifting or moving of the mat or when securing articles thereto;
   wherein one securement portion comprises a support plate; an attachment member for attaching the loop portion to the support plate; and a base plate that includes the opening for receiving the joining member; and
   wherein the loop portion is movable to a lifting position that exposes the loop above the working surface of the mat for engagement by a hook or other grasping element for lifting, manipulation or movement of the mat or for securing other articles to the lifting element.

17. The crane mat of claim 16 further comprising longitudinal steel plates between adjacent longitudinal beams.

18. The crane mat of claim 16 wherein the joining member comprises a rod or carriage bolt; and wherein the longitudinal beams have a rectangular cross section with width by height dimensions of between about 6 by 6 inches to about 24 by 24 inches and a length of between about 4 and about 60 feet; and are made of wood, metal, plastic or elastomeric materials that are solid; hollow and unfilled or filled with other materials; or are composed of layers oriented so that the lateral apertures and joining members pass through each layer.

19. The crane mat of claim 16 wherein the loop portion comprises a D-shaped member, an O-shaped member, a U-shaped member, an eyelet, a hook, a portion of a circular or polygonal ring, chain link, or cable that has sufficient strength to provide certified overhead lifting of the mat for installation and reclamation thereof.

20. The crane mat of claim 16, wherein the recess is a vertically arranged slot that is configured to receive the component with the loop portion below the working surface in the storage position, wherein the loop portion can pivot to the lifting position to expose the loop portion above the mat working surface.

* * * * *

UNITED STATES PATENT AND TRADEMARK OFFICE
CERTIFICATE OF CORRECTION

PATENT NO. : 9,617,693 B1  
APPLICATION NO. : 15/377545  
DATED : April 11, 2017  
INVENTOR(S) : Penland, Jr.

Page 1 of 1

It is certified that error appears in the above-identified patent and that said Letters Patent is hereby corrected as shown below:

On the Title Page

Item (57) ABSTRACT, Line 3, before "the supporting structure or the upper or", delete "attached to".

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*